(12) United States Patent
LeBlanc

(10) Patent No.: US 10,322,809 B2
(45) Date of Patent: Jun. 18, 2019

(54) MOLDED SIDEWALL ARMREST BETWEEN FUSELAGE FRAME BAYS

(71) Applicant: The Boeing Company, Chicago, IL (US)

(72) Inventor: Thomas Leonard LeBlanc, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 15/233,747

(22) Filed: Aug. 10, 2016

(65) Prior Publication Data

US 2018/0044024 A1 Feb. 15, 2018

(51) Int. Cl.
*B64D 11/06* (2006.01)
*B64C 1/06* (2006.01)

(52) U.S. Cl.
CPC .......... *B64D 11/0646* (2014.12); *B64C 1/066* (2013.01); *B64D 11/0636* (2014.12)

(58) Field of Classification Search
CPC .. B64D 11/0646; B64D 11/0636; B64D 11/06
See application file for complete search history.

(56) References Cited

U.S. PATENT DOCUMENTS

| | | | | |
|---|---|---|---|---|
| 1,548,334 A | * | 8/1925 | Sebell | B60N 2/34 297/284.3 |
| D439,425 S | * | 3/2001 | Park | D6/356 |
| 9,254,766 B2 | | 2/2016 | Lightbody et al. | |
| 2001/0003962 A1 | * | 6/2001 | Park | A47C 1/0352 108/140 |
| 2003/0071507 A1 | * | 4/2003 | Sankrithi | B60N 3/08 297/411.21 |
| 2007/0273177 A1 | * | 11/2007 | Sankrithi | B60P 3/423 296/181.1 |
| 2014/0300149 A1 | * | 10/2014 | Lightbody | B60N 2/466 297/188.14 |

FOREIGN PATENT DOCUMENTS

EP 2899125 A1 7/2015

OTHER PUBLICATIONS

King Air 90 Arm Ledge Table System, 2015, http://www.avfab.com/kingair/king-air-90-arm-ledge-table-system.
odyclub.com, Welcome to Honda Odyssey Forum: Odyssey Minivan Forums—General discussion forum for Honda Odyssey; DIY How to Install 1st Gen Coilovers 2016; http://www.odyclub.com/forums/28-1995-1998-odyssey/67437-diy-how-install-1st-gen-coilovers.html.

* cited by examiner

*Primary Examiner* — Justin M Benedik
(74) *Attorney, Agent, or Firm* — Parsons Behle & Latimer

(57) ABSTRACT

An armrest system may include an inner sidewall panel attached to a vehicle frame. The inner sidewall panel may abut at least two parallel frame members of the vehicle frame. The system may further include a ledge molded into a shape of the inner sidewall panel. The ledge may be positioned horizontally along a front surface of the inner sidewall panel and may be positioned between the at least two parallel frame members.

20 Claims, 6 Drawing Sheets

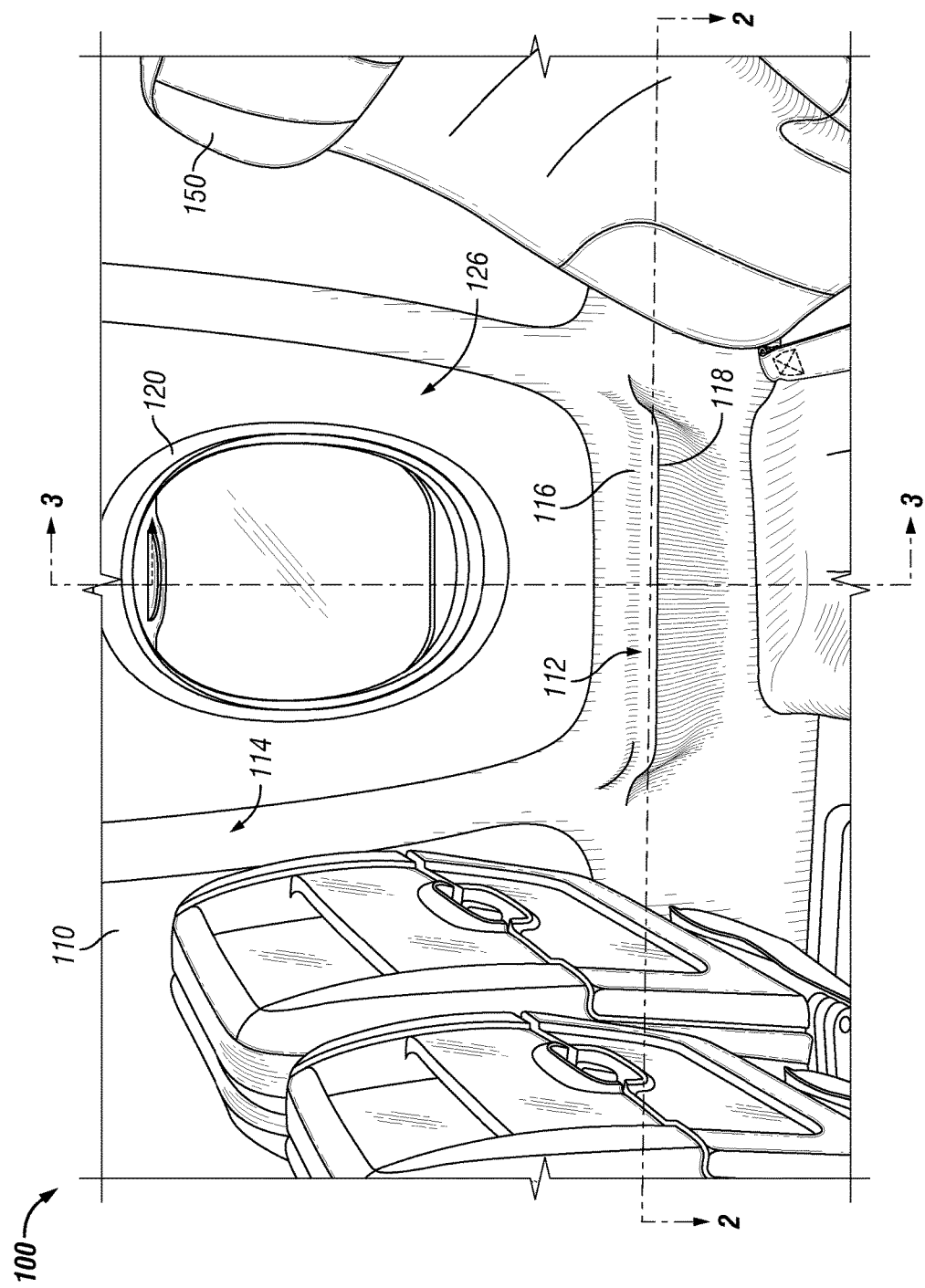

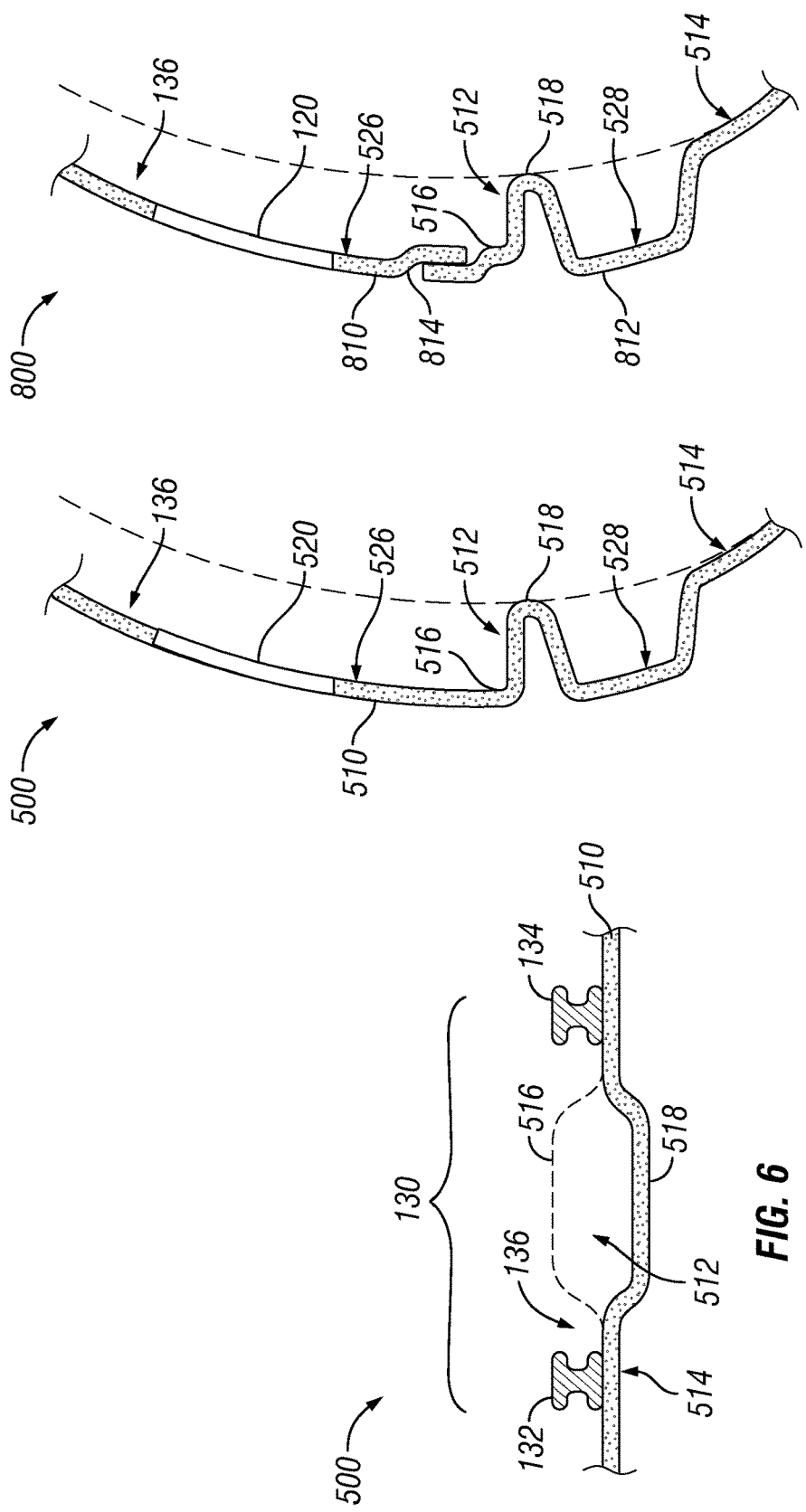

MOLDED SIDEWALL ARMREST BETWEEN FUSELAGE FRAME BAYS

FIELD OF THE DISCLOSURE

The disclosure generally relates to the field of armrest systems and more specifically to a molded sidewall armrest between fuselage frame bays of an aircraft.

BACKGROUND

As air travel becomes more prevalent to the modern lifestyle, competition among commercial airlines has created a need for more comfortable passenger seating within aircraft cabins while maximizing the occupancy of the aircraft. One of the common fixtures of comfort within an aircraft is the armrest.

Typical armrests are bulky and, when attached to each edge of a seat, take up valuable space within the cabin of an aircraft or other vehicle. Armrests may also contribute significantly to the weight of the vehicle. However, eliminating armrests entirely is not a viable option because it would significantly diminish the comfort of passengers.

To overcome this problem, some armrests have been designed to attach to a wall of an aircraft instead of the seat, allowing additional spacing in each row of seats. Unfortunately, these armrest systems may need additional mounting hardware, resulting in additional weight and potentially less structural integrity. Further, these armrests may extend uncomfortably into a passengers personal space. What is needed is an armrest system that increases space within an aircraft cabin while reducing weight and cost limitations.

SUMMARY

Disclosed is an armrest system that overcomes one or more of the challenges associated with typical armrests. In an embodiment, an armrest is molded into the shape of an inner sidewall panel of a vehicle. By being molded into the shape of the inner sidewall panel, the armrest may be lightweight, yet durable. Further, the armrest may extend into the sidewall panel between frame bays of the vehicle, allowing more space within a cabin of the vehicle.

In an embodiment, an armrest system includes an inner sidewall panel attached to a vehicle frame. The inner sidewall panel abuts at least two parallel frame members of the vehicle frame. The system further includes a ledge molded into a shape of the inner sidewall panel. The ledge is positioned horizontally along a front surface of the inner sidewall panel and is positioned between the at least two parallel frame members.

In some embodiments, the system further includes at least one seat attached to the vehicle frame, where the inner sidewall panel is adjacent to the seat. In some embodiments, a front edge of the ledge extends outward from the front surface of the inner sidewall panel. In some embodiments, the system includes a depression in the front surface of the inner sidewall that extends inward, where the depression extends into a space between the at least two frame members, and wherein a back edge of the ledge extends into the depression. In some embodiments, the system also includes a lower depression in the front surface of the inner sidewall that extends inward, the lower depression being below the ledge. In some embodiments, the system includes a storage retaining mechanism attached to the inner sidewall and configured to retain items within the lower depression. In some embodiments, the system includes at least one opening in inner sidewall panel, the opening configured to frame a window of the vehicle. In some embodiments, the system includes a second inner sidewall panel attached to the vehicle frame above the first inner sidewall panel, the second inner sidewall panel including at least one opening configured to frame a window of the vehicle. In some embodiments, the inner sidewall panel is formed from a fiberglass honeycomb material. In some embodiments, the vehicle frame is an airframe of an aircraft.

In an embodiment, an armrest system includes an inner sidewall panel configured to attach to a vehicle frame. The inner sidewall panel is configured to abut at least two parallel frame members of the vehicle frame when attached to the vehicle frame. The system also includes a ledge formed into a shape of the inner sidewall panel. The ledge is positioned horizontally along a front surface of the inner sidewall panel.

In an embodiment, a method of forming an armrest system includes forming an inner sidewall panel configured to attach to a vehicle frame. The inner sidewall panel is configured to abut at least two parallel frame members of the vehicle frame when attached to the vehicle frame. The method further includes forming a ledge into a shape of the inner sidewall panel. The ledge is positioned horizontally along a front surface of the inner sidewall panel. In some embodiments, the method also includes attaching the inner sidewall to the vehicle frame.

BRIEF DESCRIPTION OF THE DRAWINGS

FIG. 1 depicts an embodiment of an armrest system.

FIG. 6 depicts a horizontal cross section diagram of an embodiment of the armrest system.

FIG. 7 depicts a vertical cross section diagram of an embodiment of the armrest system.

FIG. 8 depicts a vertical cross section diagram of another embodiment of the armrest system.

Figure 4:
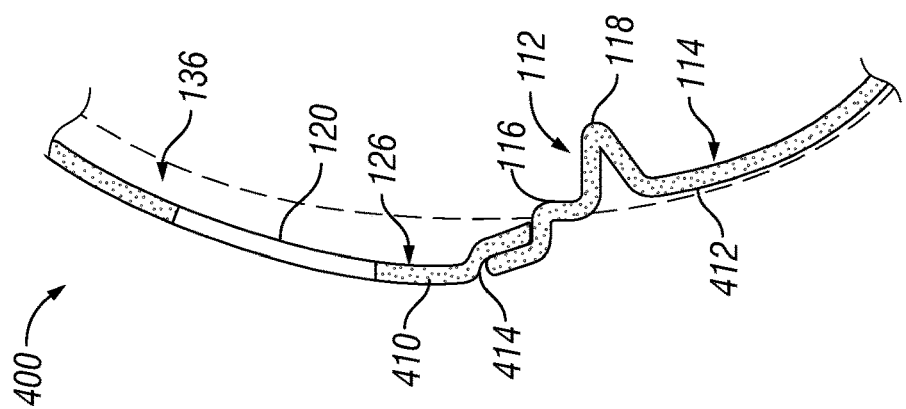
FIG. 4 depicts a vertical cross section diagram of another embodiment of the armrest system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, an embodiment of an armrest system 100 is depicted. The armrest system 100 may be installed within vehicles, particularly aircraft, in order to eliminate unnecessary armrests attached to seats, thereby saving space within aircraft cabins.

The armrest system 100 may include an inner sidewall panel 110. The inner sidewall panel 110 may be adapted to attach to a fuselage of an aircraft to form an inner sidewall of a cabin, as described herein. As depicted in FIG. 1, the inner sidewall panel 110 may be molded as a single component, rather than assembled from multiple components. By incorporating an armrest into the molded shape of the inner sidewall panel 110, costs associated with additional hardware and mounting techniques may be avoided. Further, the armrest may be structurally incorporated into the inner sidewall panel 110, resulting in greater structural integrity as compared to typical armrest systems. As discussed herein, the armrest may also make use of space (e.g., between frame bays) that might otherwise be wasted. In some embodiments, the inner sidewall panel 110 may include a fiberglass honeycomb material for lightweight durability.

The monolithic inner sidewall panel 110 may include a front surface 114 with a ledge 112 extending outward from the front surface 114. As used herein, extending outward means to extend away from a perimeter of the aircraft cabin toward the interior of the cabin. For example, in the embodiment depicted in FIG. 1, a back edge 116 of the ledge 112 may substantially align with the front surface 114 of the inner sidewall panel 110. The ledge 112 may extend outward into the cabin from the back edge 116 to a front edge 118 (shown in FIG. 2).

An opening 120 may be defined within the inner sidewall panel 110. The opening 120 may frame, or otherwise surround, a window. A depression may also be defined or otherwise formed within the inner sidewall panel 110 by a recessed surface 126. The recessed surface 126 may extend inward relative to the front surface 114 of the inner sidewall panel 110.

The inner sidewall panel 110 may be installed adjacent to a seat 150. When installed, the ledge 112 may be positioned to support the forearm of a passenger sitting in the seat 150. For example, the ledge 112 may be positioned horizontally next to the seat at a height that is convenient for passengers to place their forearm on the ledge 112 while sitting in the seat 150.

By defining an armrest in a shape of the inner sidewall panel 110, the seat 150 may omit an attached armrest that would otherwise take up valuable space within the cabin. In some cases, this may enable the aircraft to include one or more additional seats within the aircraft, increasing the profitability of using the aircraft for passenger travel. Other benefits and advantages may be apparent to persons of skill in the relevant art having the benefit of this disclosure.

Figure 2:
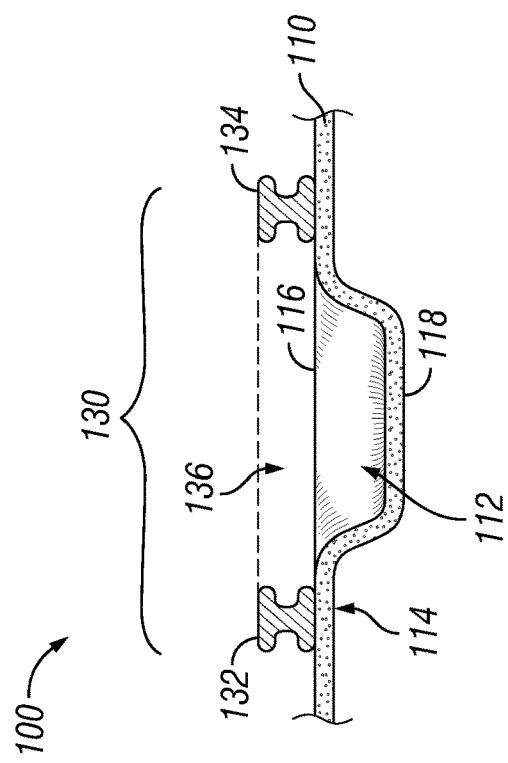
FIG. 2 depicts a horizontal cross section diagram of an embodiment of the armrest system.

Referring to FIG. 2, a cross section view of the embodiment of the armrest system 100 at the line denoted by the number 2 is depicted. As shown in FIG. 2, an airframe 130 may include multiple parallel lateral members (or frame bays) such as the ribs 132, 134. When installed in an aircraft, the inner sidewall panel 110 may abut the ribs 132, 134 on both sides of the ledge 112, forming a barrier between the airframe 130 and a cabin of the aircraft. The inner sidewall panel 110 may differ from other panels and attachments to the aircraft fuselage in that the inner sidewall panel 110 spans multiple ribs. Thus, while a typical armrest system may attach to only a small portion of a fuselage, the armrest described herein is formed as part of the inner sidewall panel 110, which abuts multiple members of the fuselage.

In the embodiment of FIGS. 1 and 2, the back edge 116 may be substantially flush with the front surface 114 of the inner sidewall panel 110 leaving a space 136 between the ribs 132, 134 open. The front edge 118 may extend outward to form the ledge 112. In other embodiments, as described herein, the armrest may be defined within the space 136 to increase a perceived or actual volume within an aircraft cabin.

The ledge 112 may be aligned with the aircraft windows such that the ledge 112 runs along the front surface 114 of the inner sidewall panel 110 between the ribs 132, 134, but becomes flush with the front surface 114 at a portion of the inner sidewall panel 110 that abuts the ribs 132, 134. By keeping the armrest between the ribs 132, 134, the surfaces of the inner sidewall panel 110 that abut the ribs 132, 134 may be free to attach to the ribs 132, 134 without interference from the shape of the armrest.

Figure 3:
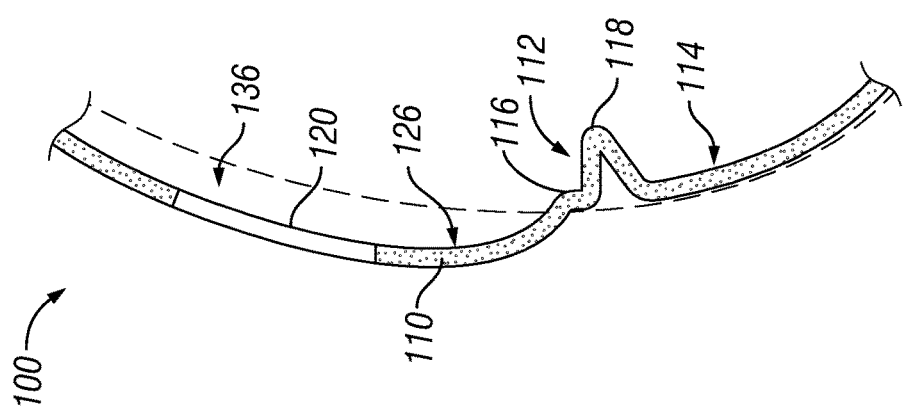
FIG. 3 depicts a vertical cross section diagram of an embodiment of the armrest system.

Referring to FIG. 3, a cross section view of the embodiment of the armrest system 100 at the line denoted by the number 3 is depicted. From FIG. 3 it can be seen that the ledge 112 extends away from the space 136 between the ribs as denoted by the dotted line. Other portions of the inner sidewall panel 110 may extend into the space 136. For example, the recessed surface 126 may extend into the space 136.

Referring to FIG. 4, an alternative embodiment of an armrest system 400 is depicted. In the alternative embodiment, the system 400 may be constructed to include an upper sidewall panel 410 and a lower sidewall panel 412, where the upper sidewall panel 410 is attached to the airframe above the lower sidewall panel 412. The upper sidewall panel 410 and the lower sidewall panel 412 may be joined at a connection point 414. Although FIG. 4 depicts the connection point 414 as overlapping portions of the sidewall panels 410, 412, in some embodiments, other connection techniques or mechanisms may be used. This modular design may enable the lower sidewall panel 412 to be interchangeable with a lower sidewall panel that does not include an armrest for portions of a cabin that may not have adjacent seating.

Figure 5:
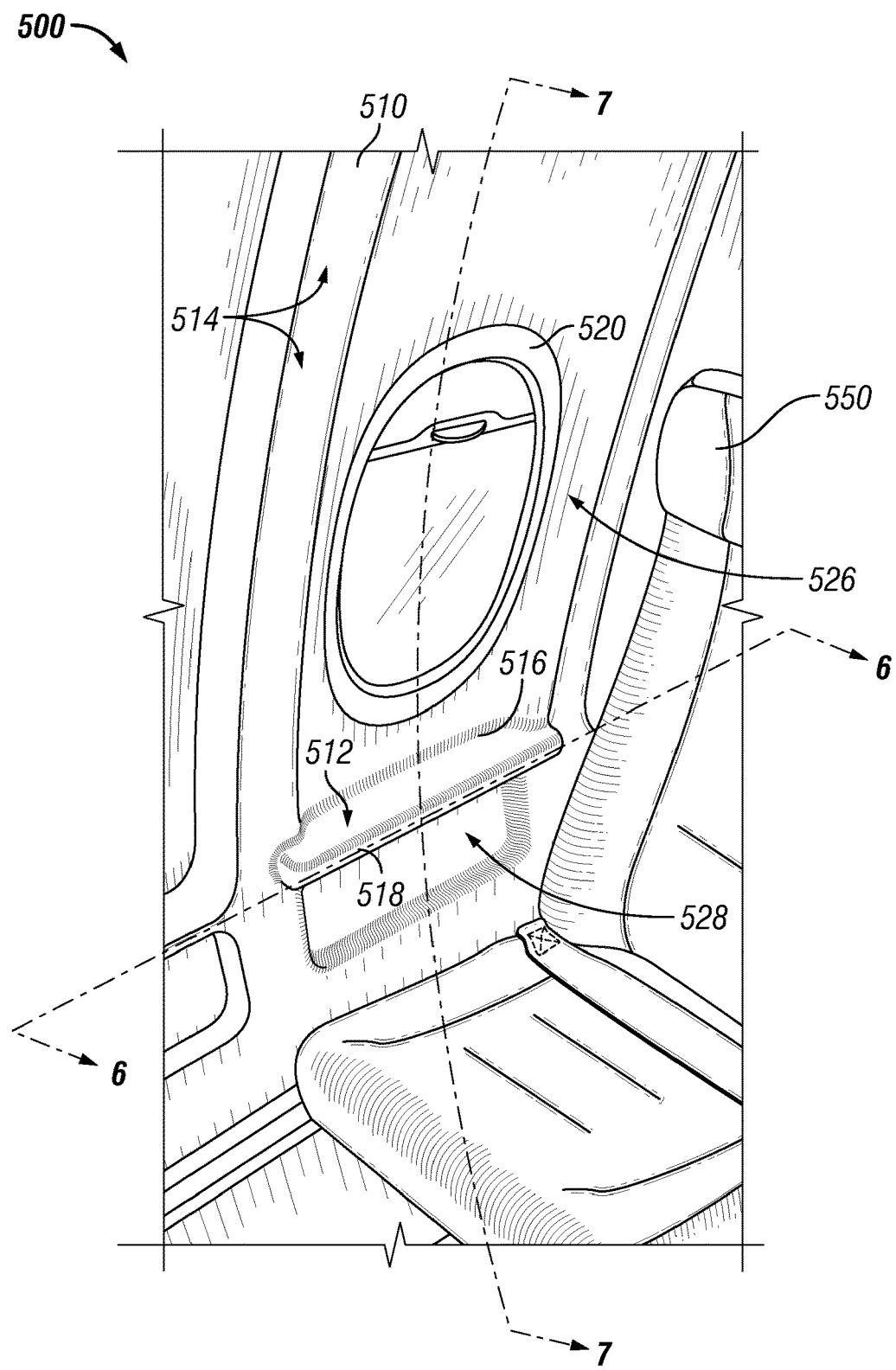
FIG. 5 depicts an embodiment of an armrest system.

Referring to FIG. 5, an embodiment of an armrest system 500 is depicted. The armrest system 500 may differ from the armrest system 100 in that it extends inward into a space between frame bays instead of, or in addition to, outward into the cabin.

Similar to the armrest system 100, the armrest system 500 may include a monolithic inner sidewall panel 510. The inner sidewall panel 510 may be adapted to attach to a fuselage of an aircraft and may be molded as a single component, rather than assembled from multiple components.

The inner sidewall panel 510 may include a front surface 514 with a depression defined by a recessed surface 526 that extends inward from the front surface 514. A ledge 512 may extend into the depression and adjoin the recessed surface 526. Extending inward means to extend toward the perimeter of the aircraft away from the interior of the cabin. For example, in the embodiment depicted in FIG. 5, a front edge 518 of the ledge 512 may substantially align with the front surface 514 of the inner sidewall panel 510. The ledge 512 may extend inward into the inner sidewall panel 510 from the front edge 518 to a back edge 516. By extending inward, the depression formed by the recessed surface 526 may make use of space between frame bays of an aircraft fuselage that might otherwise be wasted.

A second indentation may be formed by a second recessed surface 528 extending into the inner sidewall 510. The second indentation formed by the second recessed surface 528 may be positioned below the ledge 512 in order to provide room for a passengers' hips while the passenger is seated.

An opening 520 may be defined within the inner sidewall panel 510. The opening 520 may frame, or otherwise surround, a window. As with the armrest system 100, the inner sidewall panel 510 may be installed adjacent to a seat 550.

When installed, the ledge 512 may be positioned to support the forearm of a passenger sitting in the seat 550. For example, the ledge 512 may be positioned horizontally next to the seat at a height that is convenient for passengers to place their forearm on the ledge 512 while sitting in the seat 550.

By extending into the inner sidewall panel 510, the ledge 512 may provide more space within an aircraft cabin. The additional space may increase passenger comfort and may enable one or more additional seats to be added to commercial aircraft. Other benefits and advantages may be apparent to persons of skill in the relevant art having the benefit of this disclosure.

Referring to FIG. 6, a cross section view of the embodiment of the armrest system 500 at the line denoted by the number 6 is depicted. As depicted in FIG. 6, when installed in an aircraft, the inner sidewall panel 510 may abut the ribs 132, 134 on both sides of the ledge 512, forming a barrier between the airframe 130 and a cabin of the aircraft. As with the armrest system 100, the inner sidewall panel 510 may differ from other panels and attachments to the aircraft fuselage in that the inner sidewall panel 510 spans multiple ribs. In the embodiment of FIGS. 5 and 6, the front edge 518 may be substantially flush with, or in some embodiments (as depicted in FIG. 5) may protrude slightly outward from, the front surface 514 of the inner sidewall panel 510. The back edge 516 may extend inward between the ribs 132, 134 to occupy the space 136 between the ribs 132, 134. As explained herein, by extending into the sidewall 510, more space within the cabin may be preserved. Other benefits and advantages may be apparent to persons of skill in the relevant art having the benefit of this disclosure.

Referring to FIG. 7, a cross section view of the embodiment of the armrest system 500 at the line denoted by the number 7 is depicted. From FIG. 7 it can be seen that the ledge 512 extends into the space 136 between the ribs as denoted by the dotted line. It can further be seen that the recessed surface 526 forms a first indentation within the space 136 and the second recessed surface 528 forms a second indentation within the space 136.

Referring to FIG. 8, an alternative embodiment of an armrest system 800 is depicted. In the alternative embodiment, the system 800 may be constructed to include an upper sidewall panel 810 and a lower sidewall panel 812. The upper sidewall panel 810 and the lower sidewall panel 812 may be joined at a connection point 814. Although FIG. 8 depicts the connection point 814 as overlapping portions of the sidewall panels 810, 812, in some embodiments, other connection techniques or mechanisms may be used. This modular design may enable the lower sidewall panel 812 to be interchangeable with a lower sidewall panel that does not include an armrest for portions of a cabin that may not have adjacent seating.

Figure 9:
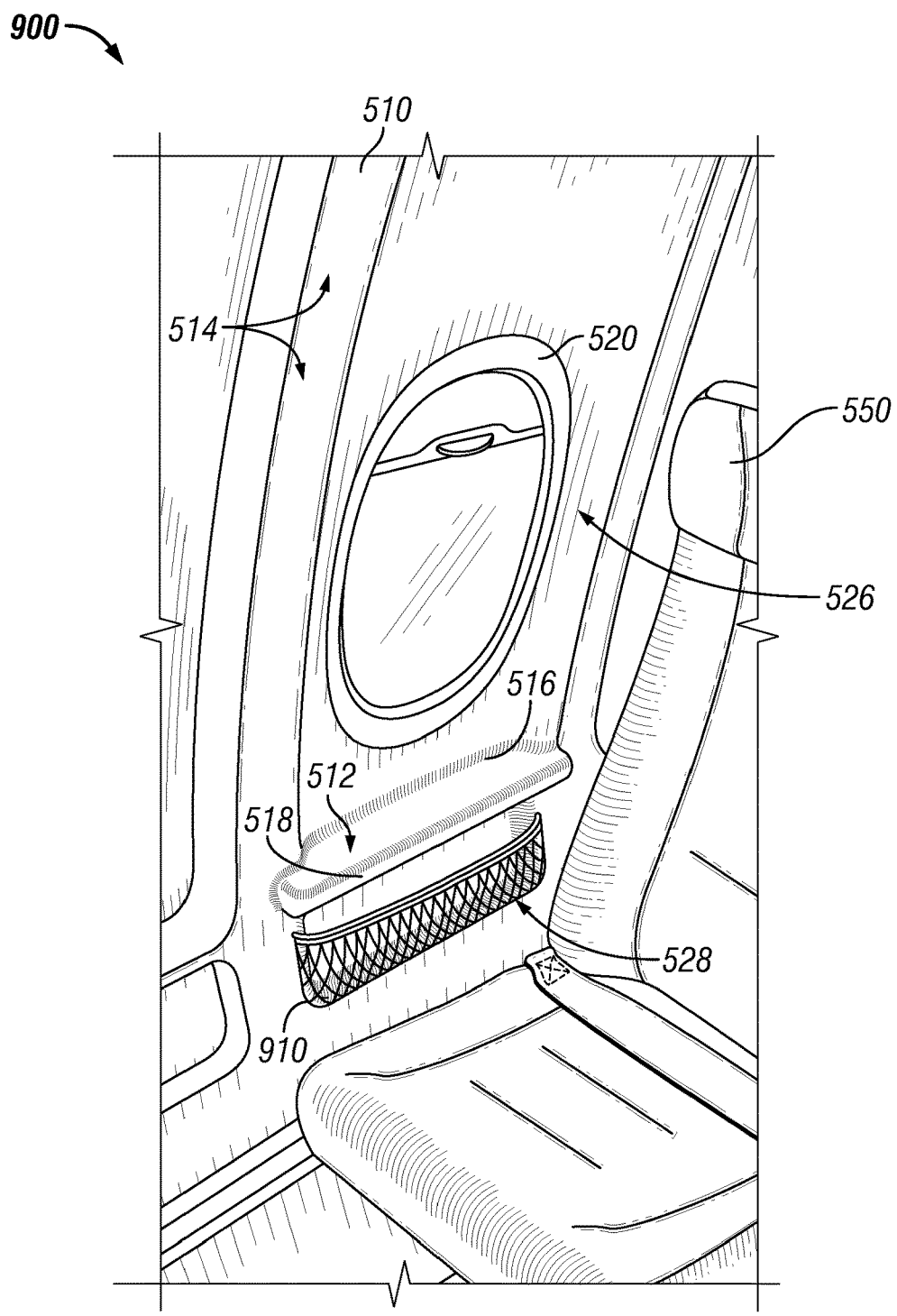
FIG. 9 is an embodiment of an armrest system including storage.

Referring to FIG. 9, an embodiment of an armrest system 900 that includes storage is depicted. The system 900 may include a retaining mechanism, such as a net 910, to enable a passenger to store personal items within the second recessed surface 528 during a flight. Although FIG. 9 depicts the retaining mechanism as a net, persons of skill in the art will recognize that alternative retaining mechanism may be used such as a molded divider, a door, a latch, or another type of holder or barrier. An advantage of storing personal items in the second recessed surface 528 is that passengers may have additional or alternate storage areas. In some cases, an airline may charge a premium for the additional storage. In some cases, an airline may remove other storage areas (e.g., seat front pockets) thereby resulting in more space for the passenger. Other benefits and advantages may be apparent to persons of ordinary skill in the art having the benefit of this disclosure.

Figure 10:
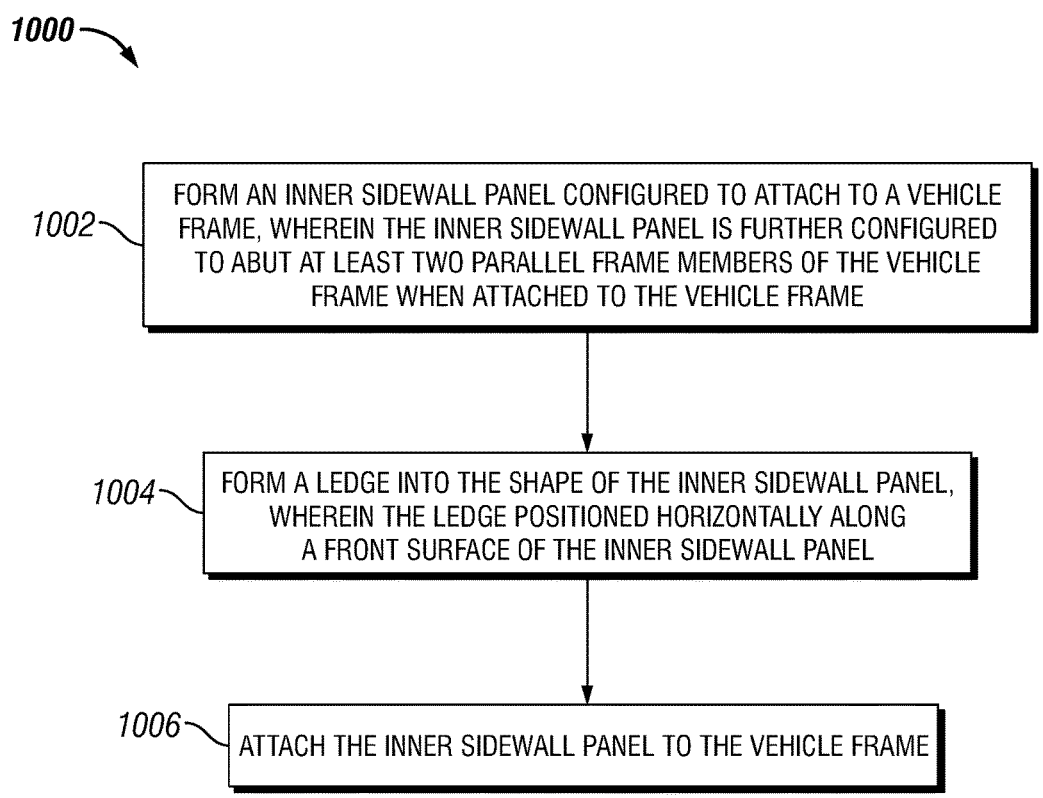
FIG. 10 is a flow chart depicting an embodiment of a method of forming an embodiment of an armrest system.

Referring to FIG. 10, an embodiment of a method 1000 of forming an armrest system is depicted. The method 1000 may include forming a monolithic inner sidewall panel configured to attach to a vehicle frame adjacent to a seat, at 1002. The inner sidewall panel may be further configured to abut at least two parallel frame members of the vehicle frame when attached to the vehicle frame. For example, the inner sidewall panel 110100 or the inner sidewall panel 510 may be formed.

The method 1000 may further include forming a ledge in the inner sidewall panel, at 1004. The ledge may be configured to be positioned horizontally and adjacent to the seat when the inner sidewall panel is attached to the vehicle frame. Further, the ledge may enable support of a forearm. For example, the ledge 112 or the ledge 512 may be formed or otherwise molded as part of the shape of the inner sidewall panel 110 or the inner sidewall panel 510.

The method 1000 may also include attaching the inner sidewall to the vehicle frame, at 1006. For example, the inner sidewall panel 110 or the inner sidewall panel 510 may be attached to the airframe 130.

A benefit of the method 1000 is that an inner sidewall panel may be formed that includes an armrest system, thereby eliminating the need to attach an armrest to a seat adjacent to the inner sidewall panel. As such, space within an aircraft cabin may be conserved.

Although various embodiments have been shown and described, the present disclosure is not so limited and will be understood to include all such modifications and variations are would be apparent to one skilled in the art.

What is claimed is:

1. An armrest system comprising:
   an inner sidewall panel attached to a vehicle frame, wherein the inner sidewall panel abuts at least two parallel frame members of the vehicle frame; and
   a ledge molded into a shape of the inner sidewall panel, wherein the ledge is positioned horizontally along a front surface of the inner sidewall panel and is positioned between the at least two parallel frame members, a length of the ledge extending from a first side of the ledge to a second side of the ledge, wherein the ledge terminates at the first side and at the second side to become flush with the front surface of the inner sidewall panel at portions of the inner sidewall panel that abut the at least two parallel frame members.

2. The system of claim 1, further comprising at least one seat attached to the vehicle frame, wherein the inner sidewall panel is adjacent to the seat.

3. The armrest system of claim 1, wherein a front edge of the ledge extends outward from the front surface of the inner sidewall panel.

4. The armrest system of claim 1, further comprising:
   a depression in the front surface of the inner sidewall panel that extends inward, wherein the depression extends into a space between the at least two parallel frame members, and wherein a back edge of the ledge extends into the depression.

5. The armrest system of claim 1, further comprising:
   a lower depression in the front surface of the inner sidewall that extends inward, the lower depression being below the ledge.

6. The armrest system of claim 5, further comprising:
a storage retaining mechanism attached to the inner sidewall and configured to retain items within the lower depression.

7. The armrest system of claim 1, further comprising:
at least one opening in the inner sidewall panel, the opening configured to frame a window of the vehicle.

8. The armrest system of claim 1, further comprising:
a second inner sidewall panel attached to the vehicle frame above the first inner sidewall panel, the second inner sidewall panel comprising at least one opening configured to frame a window of the vehicle.

9. The armrest system of claim 1, wherein the inner sidewall panel is formed from a fiberglass honeycomb material.

10. The armrest system of claim 1, wherein the vehicle frame is an airframe of an aircraft.

11. An armrest system comprising:
an inner sidewall panel configured to attach to a vehicle frame, wherein the inner sidewall panel is further configured to abut at least two parallel frame members of the vehicle frame when attached to the vehicle frame; and
a ledge formed into a shape of the inner sidewall panel, wherein the ledge is positioned horizontally along a front surface of the inner sidewall panel, a length of the ledge extending from a first side of the ledge to a second side of the ledge, wherein the ledge terminates at the first side and at the second side to become flush with the front surface of the inner sidewall panel at portions of the inner sidewall panel that are configured to abut the at least two parallel frame members.

12. The armrest system of claim 11, wherein the ledge is positioned between the at least two frame members when the inner sidewall panel is attached to the vehicle frame.

13. The armrest system of claim 11, wherein a front edge of the ledge extends outward from the front surface of the inner sidewall panel.

14. The armrest system of claim 11, further comprising:
a depression in the front surface of the inner sidewall that extends inward, wherein the depression extends into a space between the at least two parallel frame members when the inner sidewall panel is attached to the vehicle frame, and wherein a back edge of the ledge extends into the depression.

15. The armrest system of claim 11, further comprising:
a lower depression in the front surface of the inner sidewall that extends inward, the lower depression being below the ledge.

16. The armrest system of claim 11, further comprising:
a second inner sidewall panel configured to attach to the vehicle frame above the first inner sidewall panel, the second inner sidewall panel comprising at least one opening configured to frame a window of the vehicle when attached to the vehicle frame.

17. The armrest system of claim 11, wherein the inner sidewall panel is formed from a fiberglass honeycomb material.

18. The armrest system of claim 11, wherein the vehicle frame is an airframe of an aircraft.

19. A method of forming an armrest system, the method comprising:
forming an inner sidewall panel configured to attach to a vehicle frame, wherein the inner sidewall panel is further configured to abut at least two parallel frame members of the vehicle frame when attached to the vehicle frame; and
forming a ledge into a shape of the inner sidewall panel, wherein the ledge is positioned horizontally along a front surface of the inner sidewall panel, a length of the ledge extending from a first side of the ledge to a second side of the ledge, wherein the ledge terminates at the first side and at the second side to become flush with the front surface of the inner sidewall panel at portions of the inner sidewall panel that are configured to abut the at least two parallel frame members.

20. The method of claim 19, further comprising:
attaching the inner sidewall panel to the vehicle frame.

* * * * *